Patented Apr. 15, 1947

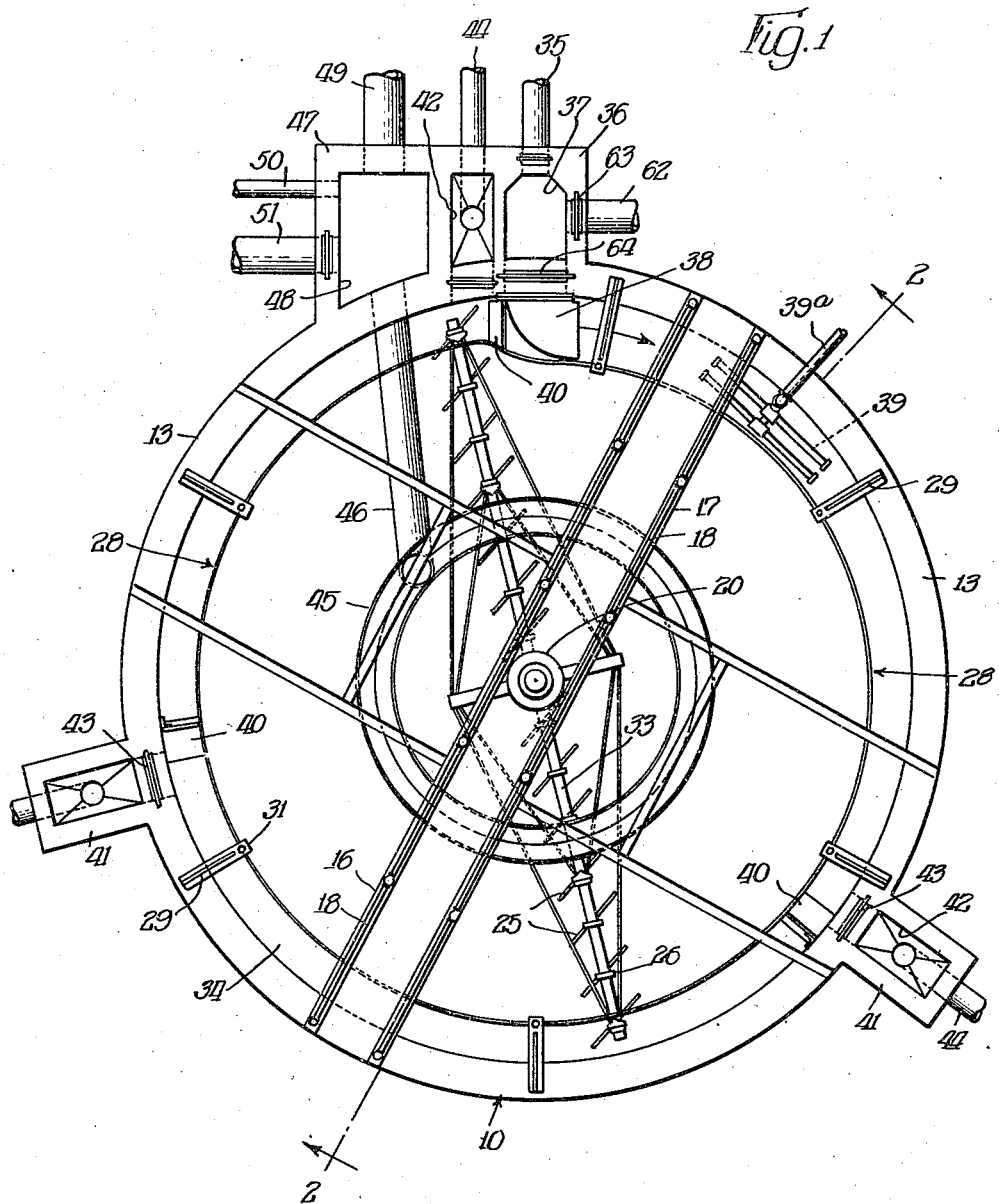

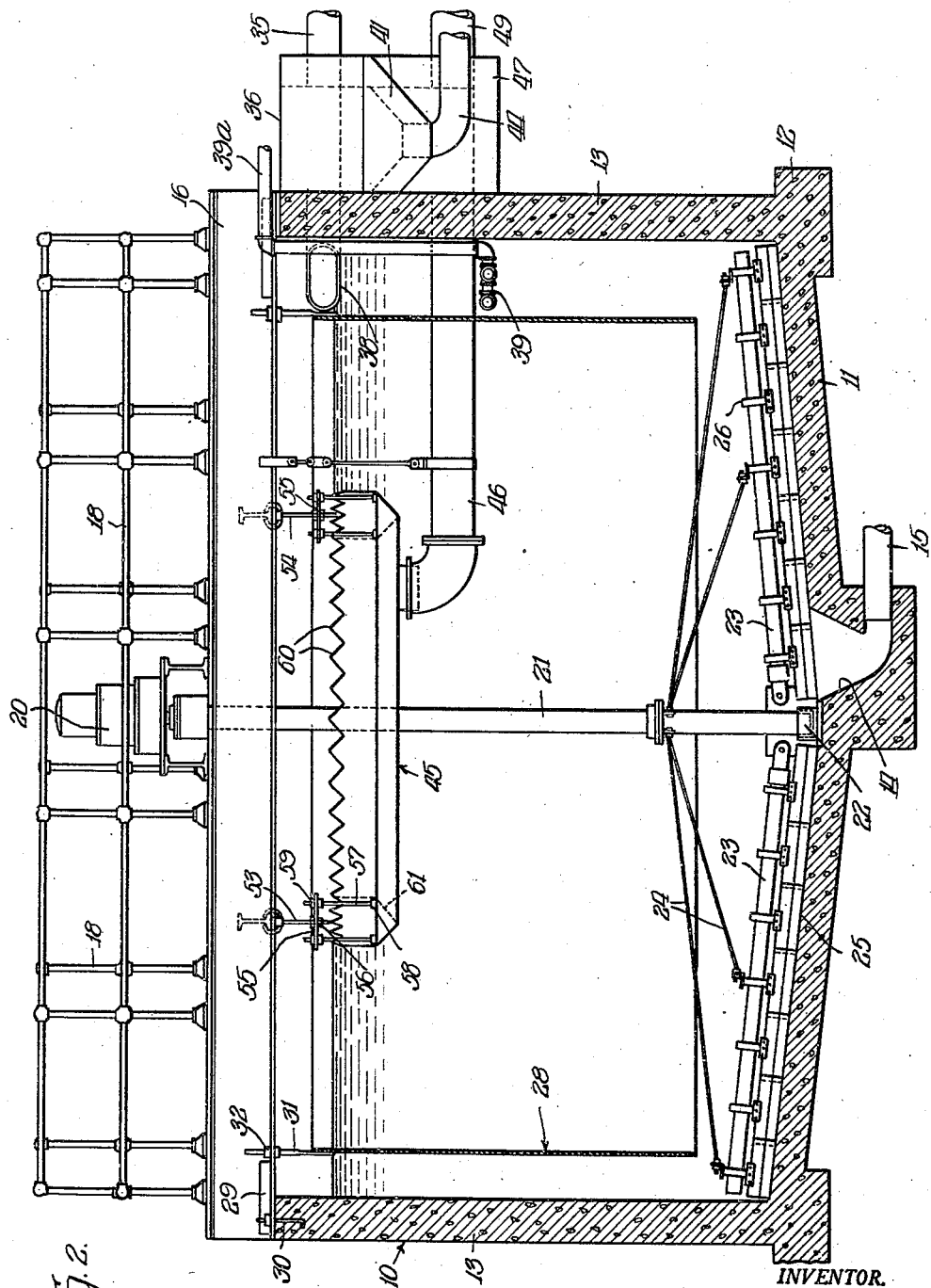

2,418,950

UNITED STATES PATENT OFFICE 2,418,950

SETTLING TANK

John A. Montgomery, Denver, Colo., assignor to Lakeside Engineering Corporation, Chicago, Ill., a corporation of Illinois Application June 12, 1944, Serial No. 539,914

5 Claims. (Cl. 210—3)

The invention relates to settling tanks for clarifying liquids and has reference more particularly to an improved settling tank especially designed for settling sewage.

An object of the invention is to provide a settling tank of circular contour having an interior depending skirt forming an annular race for the incoming sewage and a central clarifying chamber for decanting the clear effluent. The incoming sewage enters the race at the surface of the liquid and is discharged tangentially to facilitate flow around the race and spiralling movement in a downward direction toward the bottom of the tank. All of the floating objects in the incoming sewage that are too light to settle remain on the surface of the liquid in the race and are swept around to draw-off points.

Therefore another object of the invention is to provide a settling tank of the character described having one or more draw-off points in the annular race for removing the surface material such as scum and the like, the structure including baffles projecting into the liquid for diverting the scum to an outlet box.

For primary settling tanks another object of the invention is to provide air diffusing tubes adjacent the liquid inlet for coagulating the grease in the annular race to facilitate removal of the grease together with the scum and other floating material.

Another object is to provide an improved construction of launder which will have limited adjustment vertically of the clarifying chamber for withdrawing the clear effluent in the most satisfactory manner.

With these and various other objects in view the invention may consist of certain novel features of construction and operation as will be more fully described and particularly pointed out in the specification, drawings and claims appended hereto.

In the drawings which illustrate an embodiment of the invention and wherein like reference characters designate like parts—

Figure 1 is a plan elevational view of the improved settling tank of the invention; and Figure 2 is a vertical sectional view taken substantially along line 2—2 of Figure 1.

Referring to the drawings, numeral 10 indicates a circular tank or settling basin formed of concrete having a conical bottom 11 and base supporting portions 12. The circular walls 13 of the tank extend upwardly from the base portions 12 and said walls support the superstructure and other equipment for the present tank. The conical bottom 11 of the tank is provided with a sludge pocket 14 centrally located and which connects with the sludge draw-off pipe 15.

The superstructure supported by the tank includes the diametrically extending beams 16 and 17 which provide a walk across the top of the tank, the same additionally including the guard rails 18 having location on and extending upwardly from each of the beams. The said beams 16 and 17 provide the necessary support for the motor and reducing mechanism, indicated by numeral 20, which is supported by said structure centrally of the tank. The drive shaft 21 depends downwardly from the motor and reducing mechanism and terminates adjacent the bottom 11 of the tank, the terminal end of said shaft 21 being journalled and positioned by the cup-shaped member 22. Two oppositely extending inclined scraper arms 23 are suitably supported from the said terminal end of shaft 21. Each arm is suitably braced by means of the tie rods 24. A plurality of flat, sheet metal plows 25 are secured in proper spaced relation to the scraper arms 23 by means of clamps such as 26. The sheet metal plows are set at an angle with respect to the direction of rotation of the scraper arms so as to scrape the sludge from the bottom 11 of the tank and propel the same to the sludge pocket 14.

The interior of the present settling tank is divided into two compartments by means of the depending skirt 28. The radially extending supports 29 are suitably secured to the wall 13 by means of the anchor bolts 30. The depending skirt 28 is secured to said supports 29 by means of threaded rods 31, said rods being suitably welded at their lower ends to the skirt 28 and being adjustably secured to the supports 29 by means of the threaded bolts 32. Said depending skirt is substantially concentric with wall 13 of the tank and said skirt terminates short of the bottom 11. The interior of the tank is thus divided into an annular race, extending around the exterior of the depending skirt, and a clarifying chamber, located within the depending skirt. The two compartments are joined by the communicating passage below the skirt. Said annular race 34, comprising the space between wall 13 and the depending skirt 28, initially receives the liquid delivered to the tank and in accordance with the invention the liquid is discharged into the annular race in a tangential direction so as to cause movement of the liquid around the race and to also facilitate spiralling movement of the liquid in a downward direction toward the bottom of the tank, whereupon the liquid may flow under the weir formed by the bottom edge of the depending skirt 28 and into the settling chamber. It will be understood that whereas the flow of the liquid in the annular race is in a downward direction, the flow of said liquid within the clarifying chamber is in an upward direction.

The raw liquid such as sewage and the like is delivered to the present settling tank by means of the supply pipe 35 having connection with the inlet box 36 preferably constructed of concrete and formed integral with the wall 13 of the tank. From the well 37 of the inlet box the liquid is conducted to the annular race by means of the influent deflector 38 which is located at about liquid level and which functions to discharge the liquid tangentially so as to cause flow of the same around the race. Any material in the incoming sewage that is too light to settle remains on the surface of the liquid within the race and is swept around to draw-off points by means of this rotary movement of the liquid. This material is commonly referred to as scum and also includes any grease that may be in the liquid. The invention provides air diffusing means for coagulating the grease in the liquid within the annular race. Said means, indicated by numeral 39, are located about midway of the height of the tank and thus below the surface of the liquid within the annular race and also relatively close to the influent deflector 38. The said air diffusing means are suitably supplied with air by means of the supply pipe 39a.

For removing the scum the invention provides several baffles 40 having location within the annular race 34 and which depend below the level of the liquid for a depth of approximately six inches. A scum outlet box 41, having a well 42, is located adjacent each baffle 40 and suitable gates 43 are provided for controlling flow of the scum to said outlet box, from which the scum is conducted by means of the discharge pipe 44. The removal of the scum from the annular race is materially facilitated by the baffles 40 which dip into the liquid and are slightly inclined in a direction to divert the scum into the outlet boxes 41, the gates being opened for the purpose. Said boxes are preferably formed of concrete and may be built integral with the vertical wall 13 of the tank.

Within the clarifying chamber the liquid travels upwardly to the circular launder 45. The clear liquid is withdrawn from the tank by said launder and discharged through the effluent pipe 46 connecting therewith. It will be observed that said pipe passes through the depending skirt 28 into the annular race and through the wall 13 of the tank to connect with the clear liquid outlet box 47. Said box is formed of concrete, being preferably built integral with the tank and is provided with the well 48. The effluent discharge pipe 49 is connected to the box so as to drain the well. The circulating pipe 50 connects with the well of the clear liquid outlet box 47 and the bypass pipe 51 likewise connects with said well.

It will be observed that the effluent pipe 46 is below the level of the liquid in the annular race. The pipe is also located near the end of the race with respect to the direction of movement of the liquid. These constructional features are embodied in the present settling tank to minimize the turbulence caused by the pipe 46 and its interference to the flow of liquid in the race.

The launder 45 is supported from the beams 16 and 17 by means of the hangers 53 and 54 in a manner to permit limited adjustment vertically of the clarifying chamber. The hangers 53 and 54 are secured to cross pieces 55 by means of the nuts 56 which have threaded engagement with the end of the hangers. Uprights 57 suitably secured at 58 to the launder project upwardly and have adjustable connection with their respective cross piece 55. Adjustment of the uprights with respect to the cross piece is effected by means of the threaded nuts 59. By adjustment of the nuts 56 on the hangers and the nuts 59 on the uprights it is possible to vary the position of the launder vertically of the clarifying chamber and to position the same horizontally so that the clear liquid is withdrawn in the most satisfactory manner.

Both side walls of the launder are notched along the top edge to provide weirs 60 over which the liquid flows into the launder. The weirs are therefore V-shaped, as clearly illustrated in Figure 2, and the weirs are designed so that the total length of the serrated edge including both inside and outside wall of the launder is equal to at least one-half of the total length of the bottom edge of the depending skirt 28. When the serrated edge on the inside and outside wall of the launder is designed as above described the resulting notches which form the V-shaped weirs will function in the most satisfactory manner to withdraw the clear effluent from the clarifying chamber.

Another constructional feature as regards the present launder 45 is the provision of a V-shaped bottom such as indicated by numeral 61, Figure 2. The invention is not restricted to this particular shape for the bottom of the launder although it is preferred that the launder have a bottom which is not flat.

When the present settling tank is operating as a primary clarifier for raw sewage, for example, the liquid from the supply pipe 35 will enter the annular race 34 by means of the effluent deflector 38. The tangential discharge given to the incoming liquid causes the same to flow around the annular race and to travel spirally in a downward direction toward the bottom of the tank. Operation of the motor and reducing mechanism 20 will cause rotation of the scraper arms to effect removal of the settled sludge and other matter from the conical bottom 11. The liquid upon flowing under the depending skirt 28 enters the clarifying chamber and intensive clarification takes place since the flow is in an upward direction and at a relatively slow rate. The clear liquid from the clarifying chamber is discharged into the launder by flowing over the weirs 60, the liquid entering the discharge pipe 46 and being conducted thereby from the settling tank. The numeral 62, Figure 1, indicates a by-pass for the incoming liquid, the same being controlled by gate 63. The gate, indicated by numeral 64, controls flow of the incoming liquid to the settling tank.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In a settling device, in combination, a circular tank having a vertical cylindrical wall and an approximately horizontal bottom wall, a substantially concentric skirt depending within the tank in spaced relation to the walls thereof, said skirt dividing the tank into an annular race extending around the skirt and a centrally disposed clarifying chamber within the skirt, an inlet conduit for supplying incoming liquid to the annular race, a launder positioned within the clarifying chamber for withdrawing the clarified liquid, a discharge conduit for the clarified liquid connecting with the bottom of the launder and extending through the depending skirt into the annular race and through the cylindrical wall of the tank to the exterior, the portion of the discharge conduit within the annular race being positioned approximately midway of the height of the skirt and thus below the level of the liquid in said race, whereby the surface of the liquid in the race is unobstructed, a plurality of baffles positioned in spaced relation around the annular race for collecting the scum from the surface of the liquid, and an outlet in the cylindrical wall of the tank located in advance of each baffle for removing the scum collected by said baffle.

2. In a settling device, in combination, a circular tank having a vertical cylindrical wall and an approximately horizontal bottom wall, a substantially concentric skirt depending within the tank in spaced relation to the walls thereof, said skirt dividing the tank into an annular race extending around the skirt and a centrally disposed clarifying chamber within the skirt, an inlet conduit for supplying incoming liquid to the annular race, said inlet conduit having location in the annular race at approximately the level of the liquid therein and effecting discharge of the liquid in a tangential manner, a launder positioned within the clarifying chamber for withdrawing the clarified liquid, said launder having a serrated edge providing a plurality of weirs over which the clarified liquid flows into the launder, a discharge conduit for the clarified liquid connecting with the bottom of the launder and extending through the depending skirt into the annular race and through the cylindrical wall of the tank to the exterior, the portion of the discharge conduit within the annular race being positioned approximately midway of the height of the skirt and thus below the level of the liquid in said race, whereby the surface of the liquid in the race is unobstructed, a plurality of baffles positioned in spaced relation around the annular race for collecting the scum from the surface of the liquid, and an outlet in the cylindrical wall of the tank located in advance of each baffle for removing the scum collected by said baffle.

3. In a settling device, in combination, a circular tank having a vertical cylindrical wall and an approximately horizontal bottom wall, a substantially concentric skirt depending within the tank in spaced relation to the walls thereof, said skirt dividing the tank into an annular race extending around the skirt and a centrally disposed clarifying chamber within the skirt, an inlet conduit for supplying incoming liquid to the annular race, a launder positioned within the clarifying chamber for withdrawing the clarified liquid, said launder having vertically extending, spaced side walls each providing a plurality of V-shaped weirs over which the clarified liquid flows into the launder, a discharge conduit for the clarified liquid connecting with the bottom of the launder, a plurality of baffles positioned in spaced relation around the annular race for collecting the scum from the surface of the liquid, and an outlet in the cylindrical wall of the tank located in advance of each baffle for removing the scum collected by said baffle.

4. In a settling device, in combination, a circular tank having a vertical cylindrical wall and an approximately horizontal bottom wall, a substantially concentric skirt depending within the tank in spaced relation to the walls thereof, said skirt dividing the tank into an annular race extending around the skirt and a centrally disposed clarifying chamber within the skirt, an inlet conduit for supplying incoming liquid to the annular race, a launder positioned within the clarifying chamber for withdrawing the clarified liquid, said launder having a serrated edge providing a plurality of weirs over which the clarified liquid flows into the launder, a discharge conduit for the clarified liquid connecting with the bottom of the launder, air diffusing means located within the annular race approximately midway of the height of the tank and thus below the level of the liquid therein for coagulating the grease contained in said liquid, and means for removing the coagulated grease from the surface of the liquid in said annular race.

5. In a settling tank, in combination, a circular tank having a vertical cylindrical wall and an approximately horizontal bottom wall, a substantially concentric skirt depending within the tank in spaced relation to the walls thereof, said skirt dividing the tank into an annular race extending around the skirt and a centrally disposed clarifying chamber within the skirt, an inlet conduit for supplying incoming liquid to the annular race, a launder positioned within the clarifying chamber for withdrawing the clarified liquid, said launder having a serrated edge providing a plurality of weirs over which the clarified liquid flows into the launder, a discharge conduit for the clarified liquid connecting with the bottom of the launder and extending through the depending skirt into the annular race and through the cylindrical wall of the tank to the exterior, the portion of the discharge conduit within the annular race being positioned approximately midway of the height of the skirt and thus below the level of the liquid in said race, air diffusing means located within the annular race approximately midway of the height of the tank and thus below the level of the liquid therein for coagulating the grease contained in said liquid, a plurality of baffles positioned in spaced relation around the annular race for collecting the scum from the surface of the liquid, and an outlet in the cylindrical wall of the tank located in advance of each baffle for removing the scum collected by said baffles.

JOHN A. MONTGOMERY.

REFERENCES CITED

The following references are of record in the file of this patent:

UNITED STATES PATENTS

| Number | Name | Date |
|---|---|---|
| 2,051,149 | Nordell | Aug. 18, 1936 |
| 1,703,041 | Imhoff | Feb. 19, 1929 |
| 1,357,587 | Peck | Nov. 2, 1920 |
| 2,021,304 | Hardinge | Nov. 19, 1935 |
| 1,526,197 | Ahlequist | Feb. 10, 1925 |
| 1,662,702 | Hebden | Mar. 13, 1928 |
| 748,981 | Oliver | Jan. 5, 1904 |
| 801,330 | Moore | Oct. 10, 1905 |
| 2,155,960 | Thomas | Apr. 25, 1939 |
| 2,264,912 | Kupper | Dec. 2, 1941 |
| 2,272,441 | Streander | Feb. 10, 1942 |
| 1,815,159 | Nordell | July 21, 1931 |
| 2,369,194 | Weber | Feb. 13, 1945 |
| 801,330 | Moore | Oct. 10, 1905 |
| 819,664 | Lowe | May 1, 1906 |
| 1,831,170 | Gratama | Nov. 10, 1931 |
| 2,322,017 | Hartman | June 15, 1943 |
| 2,291,641 | Lemmon | Aug. 4, 1942 |